United States Patent [19]

Federico

[11] 4,074,917
[45] Feb. 21, 1978

[54] PASTRY SERVING IMPLEMENT

[76] Inventor: Arthur Federico, 4 Explorer Road, Brigantine, N.J. 08203

[21] Appl. No.: 712,029

[22] Filed: Aug. 5, 1976

[51] Int. Cl.$^2$ ............................................. A47J 43/28
[52] U.S. Cl. ......................................... 294/7; 294/25
[58] Field of Search .................................. 294/3, 5–8, 294/16, 33, 25, 27 R, 28, 29, 31 R, 99 R, 100, 103, 104, 115, 117

[56] References Cited

U.S. PATENT DOCUMENTS

| 345,846 | 7/1886 | Holmes | 294/25 X |
| 1,049,956 | 1/1913 | Wheeler | 294/104 |
| 1,104,338 | 7/1914 | Babitzky | 294/115 X |
| 2,031,183 | 2/1936 | Sonnenburg | 294/7 |
| 2,182,726 | 12/1939 | King et al. | 294/7 UX |
| 2,304,966 | 12/1942 | Thrower | 294/33 X |
| 2,561,807 | 7/1951 | Malavazos | 294/33 |

FOREIGN PATENT DOCUMENTS 5,701 of 1884 United Kingdom .............. 294/99 R

Primary Examiner—Johnny D. Cherry
Attorney, Agent, or Firm—W. Wyclif Walton

[57] ABSTRACT

The increasing popularity of on-premises purchase and consumption of confections, pastries and the like, and especially that of pizza pie, has created a demand for a serving implement or utensil with the aid of which articles may be manipulated for eating or other purposes, without involving contact of the hand or glove of the user and the present invention is directed to a serving implement comprising a pair of hinged leaves which may be actuated through linkage connected with hand-held actuating elements, as for grasping a portion of an article to hold it securely while it is being consumed or otherwise disposed of, the linkage being arranged to close the leaves upon an object in response to a squeezing action or contraction of the fingers against the actuating elements, while release of such contraction causes the implement's leaves to retract automatically allowing them to open and to remain open in their natural position.

2 Claims, 5 Drawing Figures

PASTRY SERVING IMPLEMENT

BRIEF SUMMARY OF THE INVENTION

It is a more or less general practice at so called "quick service" food purveying establishments to serve pizza pie and the like on disposable plates of paper, fiber, plastic or the like, and usually without eating utensils, and many customers habitually pick up the pastry in the fingers for transferring it to the mouth, thus permitting direct contact of the hand, which may already carry infectious or otherwise contaminating matter; the food being eaten thus also many times results in sticky components of the comestible soiling the hand or fingers. It is therefore a promotion of sanitary conditions as well as to increase convenience to consumers that the present invention is directed to a serving utensil which can be used to pick up and hold a portion of pastry to enable it to be consumed free of contact with the hand of the consumer, to avoid possible infection or contamination of the pastry as well as to avoid soiling of the fingers, the utensil comprising a pair of hinged leaves connected by linkage to hand-held actuating elements whereby a secure hold on the pastry may be maintained while it is being consumed.

BRIEF DESCRIPTION OF THE DRAWINGS

In the accompanying drawings

BRIEF DESCRIPTION OF THE PREFERRED EMBODIMENTS

Figure 1:
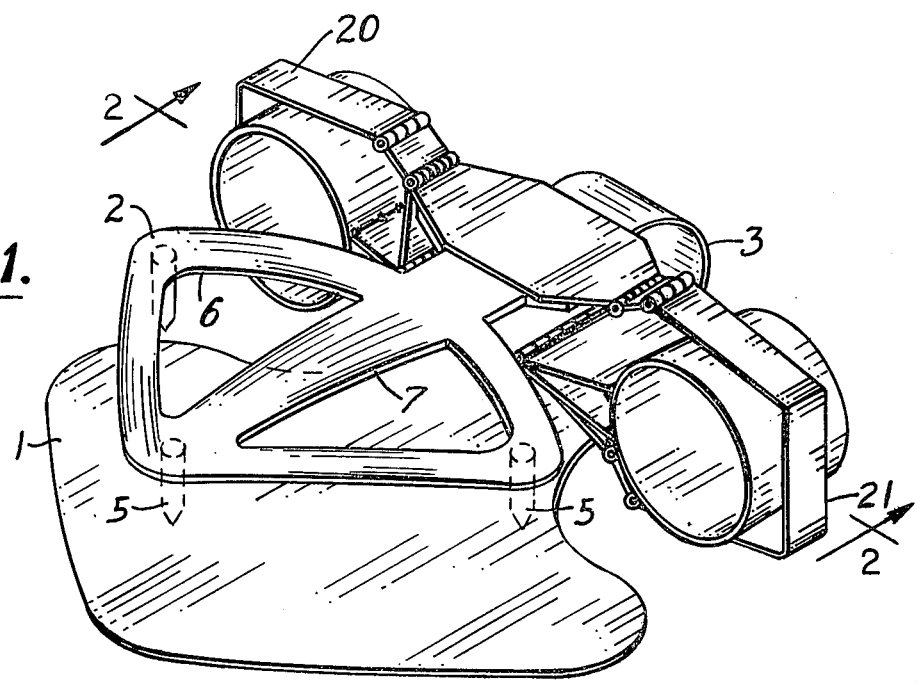
FIG. 1 is a perspective view of a preferred embodiment of the invention, with its pastry gripping blades open in position to receive a portion of pastry.
Figure 2:
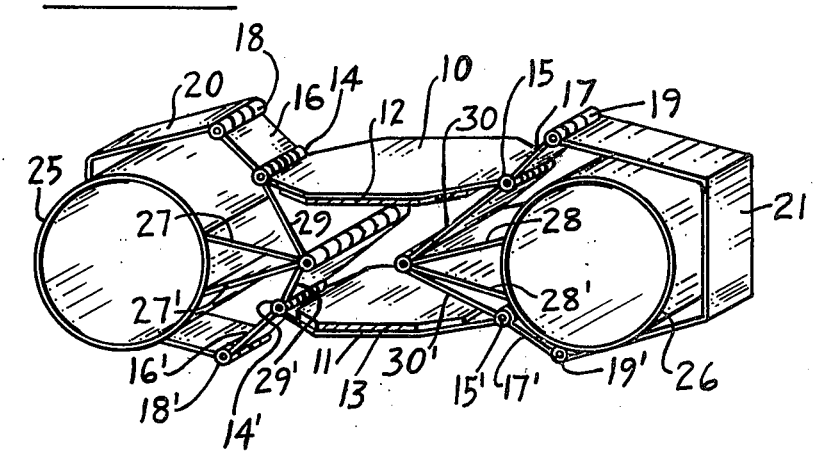
FIG. 2 is a fragmentary section in perspective on line 2—2 in FIG. 1 showing the blade actuating mechanism in greater detail.
Figure 3:
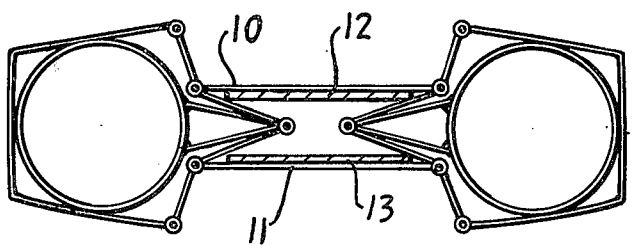
FIG. 3 is a somewhat diagrammatic section corresponding to FIG. 2 but illustrating the actuating mechanism as it appears when the blades are closed.

The implement illustrated in FIGS. 1-3 inclusive comprises a pair of articulated primary gripping leaves or blades 1, 2 preferably formed of spring metal or a relatively rigid plastic material and from a single piece, having a mid-portion 3 generally U-shaped and providing in effect a horizontal axis (not shown) about which the blades can move relatively to each other within limits imposed by other components of the implement. Preferably the lower blade 1, or peel blade, adapted to be slid under a portion of pastry or other object to enable the latter to be lifted from a supporting surface, is generally triangular in plan, while the upper blade 2 likewise generally triangular, carries depending teeth 5 for penetrating the object and present voids 6, 7 which facilitate observation of the effects of operation of the utensil with relation to the object.

As noted, blades 1 and 2 are adapted for relative movement toward and away from each other substantially about an imaginary axis to which the planes of the blades are parallel, the implement comprising in combination with such blades mechanism adapted to be hand-held and operable to move the blades toward each other about said axis, against the bias of the spring-like tendency of the mid-portion 3 to cause them to move apart.

The said actuating mechanism comprises a pair of parallel plates 10, 11 secured respectively to the shank portions 12, 13 of the blades 1, 2. At the outer ends of these plates 10, 11 there are secured by hinge connections 14, 14', 15, 15' link plates 16, 16' and 17, 17', in turn hinged at their outer edges at hinge connections 18, 18' and 19, 19' to relatively rigid strips 20, 21 which being loosely hinged together enable the shank portions 12, 13 of the blades to spring apart in response to the bias of the mid-portion 3 to maintain the blades normally in open position. For moving the blades toward each other, as for gripping a portion of pastry or the like between them, there are disposed within strips 20, 21 generally cylindrical finger stalls 25, 26 from which are projected inwardly pressure plates 27, 27' and 28, 28', respectively connected by hinged linkage plates 29, 29' and 30, 30' to the hinged connections 14, 14' and 15, 15' whereby link plates 16, 16' and 17, 17' are secured to operating plates 10, 11 carried by the shank portions of the blades. The finger stalls 25, 26 are adapted readily to receive respectively, the thumb and middle finger of the user's hand, or, if preferred, any two digits which by pressure inwardly toward each other while disposed in the finger stalls can cause the latter to move inwardly toward each other, and hence, through the operation of the linkage system just described, cause the blades 1, 2 to approach each other by movement about the said imaginary axis and normal to the direction of movement of the finger stalls.

In the drawing, for the sake of clearness of illustration, these stalls are illustrated as having relatively large axial length in relation to the width of strips 20, 21 but it will be evident that this dimension of the stalls is but a matter of choice, and in many instances their relative axial length may be made either greater than as shown, or less, but preferably not materially less than the width of strips 20, 21. Whatever the dimension of the finger stalls, the gripping action by the fingers against them can be utilized to bring the blade 2 down upon an object under which blade 1 has previously been inserted to cause the implement to grip the object and enable the latter to be manipulated, as for consuming, when the object is pastry, without contact between the object and the fingers.

Preferably the implement is constructed either of disposable plastic material, or of corrosion resistant metal, such as stainless steel, in which case re-use is generally contemplated after passage of the implement through the normal cleansing cycles of eating utensils after use.

Figure 4:
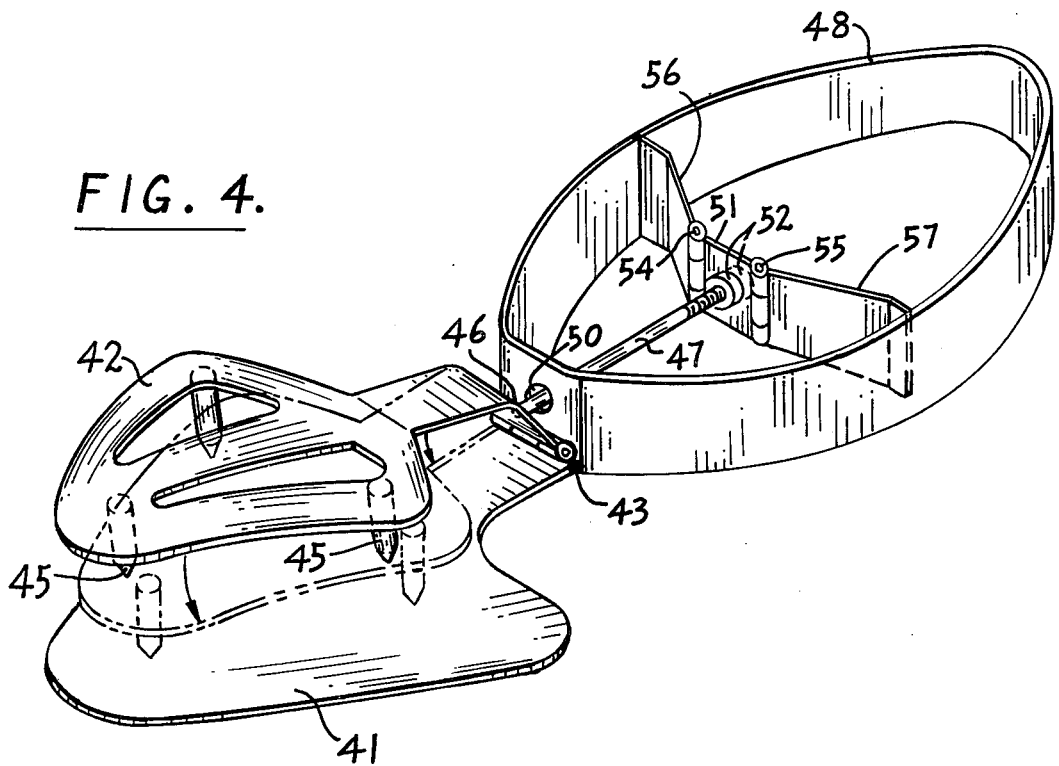
FIG. 4 is a perspective view corresponding to FIG. 1 but illustrating a modified embodiment of the invention, the closed position of the blades being illustrated in broken lines.
Figure 5:
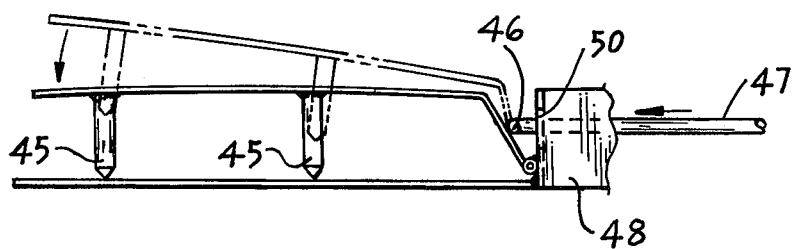
FIG. 5 is a fragmentary side elevation of the embodiment illustrated in FIG. 4 in which the open position of the blades illustrated in full lines in the latter figure is indicated in broken lines.

The modified embodiment of the invention illustrated in FIGS. 4 and 5 is constructed and operated in accordance with like principles but with some minor differences in application. Thus the primary blades 41, 42 in this embodiment are hinged about a finite hinge 43, the upper blade 42 carrying depending teeth 45 appropriate for penetrating an object to secure the hold of the utensil upon it.

For operating the blades 41, 42 in this embodiment the upper blade 42 near its connection with lower blade 41 has pivotally connected to it at a pivot 46 an actuating plunger 47 while lower blade 41 is rigid with the forward end of a generally oval or substantially elliptical yieldable resilient gripping strip 48 through an aperture 50 in which the plunger 47 extends.

The rear end of this plunger is projected through an actuating plate 51 and secured thereto as by threaded nuts 52 embracing the plate, the latter having hinged connections 54, 55 at its ends pivotally securing it to actuating plates 56, 57 respectively which are fixed to the gripping strip 48 at approximately its minor axis. These actuating plates are flexible and tend to bend forwardly toward the blades 41, 42 when the gripping strip 48 is compressed, which action forces the actuating plate 51 forward and in turn the plunger 47 which through its connection by way of pivot 46 forces the upper blade 42 to grip an object disposed on the lower one.

As in the preferred embodiment, this utensil may be made of disposable plastic, or of reusable corrosion resistant metal, it being advisable whatever the material used, that gripping strip 48 be sufficiently flexible and resilient to restore the blades to open position when gripping pressure upon it is relieved.

I claim:

1. A utensil for serving pastry and the like comprising a peel blade adapted to be introduced beneath the pastry for supporting the same and a gripping blade movable relatively to each other about a common axis, substantially U-shaped resilient yielding means integral with the blades tending to bias the blades away from each other, manually actuatable means for manipulating the utensil and linkage interconnecting said manually actuatable means and said blades for moving said blades toward each other in opposition to the bias of said yielding means in response to the actuation of said manually actuatable means, said linkage being responsive to relative movement of said manually actuatable means in substantial parallelism with said common axis, and said manually actuatable means comprise spaced elements movable toward and away from each other relatively to said peel blade to move the gripping blade toward and away from the peel blade.

2. A utensil for serving pastry and the like comprising a peel blade and a gripping blade movable relatively to each other about a common axis, yielding means tending to bias the blades away from each other, manually actuatable means for manipulating the utensil and linkage interconnecting said manually actuatable means and said blades for moving said blades toward each other in opposition to the bias of said yielding means in response to the actuating of said manually actuatable means, said manually actuatable means including a flexible resilient substantially elliptical strip and said linkage being connected thereto at the extremities of the minor axis of the elliptical strip.

* * * * *